United States Patent [19]

Sugiura et al.

[11] Patent Number: 4,578,714
[45] Date of Patent: Mar. 25, 1986

[54] HALFTONE IMAGE RECORDING APPARATUS

[75] Inventors: Susumu Sugiura, Yamato; Takashi Sugino, Kawasaki, both of Japan

[73] Assignee: Canon Kabushiki Kaisha, Tokyo, Japan

[21] Appl. No.: 680,229

[22] Filed: Dec. 10, 1984

Related U.S. Application Data

[63] Continuation of Ser. No. 360,685, Mar. 22, 1984, abandoned.

[30] Foreign Application Priority Data

Mar. 30, 1981 [JP] Japan ................... 56-45589

[51] Int. Cl.$^4$ .............................................. H04N 1/40
[52] U.S. Cl. ...................................... 358/283; 358/280
[58] Field of Search ................ 358/280, 283, 260, 298

[56] References Cited

U.S. PATENT DOCUMENTS

| | | | |
|---|---|---|---|
| 2,963,551 | 12/1960 | Schrieber et al. | 358/138 |
| 3,294,896 | 12/1966 | Young | 358/283 |
| 3,377,423 | 4/1968 | Lippel | 358/133 |
| 3,562,420 | 2/1971 | Thompson | 358/133 |
| 3,681,650 | 8/1972 | Koll | 358/283 |
| 3,830,967 | 8/1974 | Long | 358/283 |
| 4,150,400 | 4/1979 | Wong | 358/138 |
| 4,245,258 | 1/1981 | Holladay | 358/283 |
| 4,342,051 | 7/1982 | Suzuki et al. | 358/283 |

FOREIGN PATENT DOCUMENTS 55-28648 2/1980 Japan ................................ 358/283

OTHER PUBLICATIONS

Roetling–Halftone Method–Jour. Opt. Soc. of America, vol. 66, No. 10, pp. 985–989, Oct. 1976.

Primary Examiner—Joseph A. Orsino, Jr.
Attorney, Agent, or Firm—Fitzpatrick, Cella, Harper & Scinto

[57] ABSTRACT

A halftone image recording apparatus has a photoelectric converter for generating a density signal representing the density level of an image, a periodical or random signal generator for periodically or randomly generating level signals, an adder for adding the density signal and the level signals, a memory for storing the addition signal from the adder, a pattern generator for generating an image pattern, and an ink jet head or the like to record the image pattern. Pseudooutlines are eliminated without requiring an increase in the reading resolution and without imparing the resolution during recording. Input image data is compressed and a memory of smaller capacity can be used.

21 Claims, 13 Drawing Figures

HALFTONE IMAGE RECORDING APPARATUS

This application is a continuation of application Ser. No. 360,685 filed Mar. 22, 1984 now abandoned.

BACKGROUND OF THE INVENTION

1. Field of the Invention

The present invention relates to an image recording apparatus for recording an image with dots and, more particularly, to a halftone image recording apparatus which is capable of recording an image in halftone.

2. Description of the Prior Art

Conventional dot recording apparatuses include those of wire dot type, electrostatic type, electrophotographic type, ink jet type and so on. As a halftone image forming method with such a dot recording apparatus, a method is known wherein a picture element has a 4×4 dot matrix to provide 17 gradation steps. In other words, the picture element has an n×m dot matrix to provide (n·m+1) gradation steps. In accordance with the level of an input signal, one of (n·m+1) patterns is selected. Dot printing is performed in accordance with the selected pattern. However, when 17 gradation steps are provided with the 4×4 dot matrix of this method, the gradation becomes too abrupt for recording an image having a smooth gradation change such as human skin. A pseudooutline is then generated which degrades the image quality. On the other hand, when the number of gradation steps is increased, the area of one picture element is increased, resulting in degradation in resolution. When resolution is degraded, characters, symbols or parts of hairs, for example, are blurred.

As such a halftone image forming method, the dither method is also known. According to this method, the level of the input image signal is systematically converted into binary values through a matrix including sixteen thresholds, from 0 to 15. Such a dither method is introduced, for example, in "Binary Display of Halftone Images According to the Dither Method", Nikkei Electronics, May 1, 1978. However, this dither method is subject to a drawback; the resolution in reading out the image must be improved. A general television picture includes picture information of about 512×490 picture elements. Therefore, when the picture information is converted into binary values in correspondence with the original image information and printed accordingly, the gradation is degraded very much and the printing area is extremely decreased (the printing area becomes about 64×61.25 mm if printing is performed with a resolution of 8 PEL). When a 4×4 dot matrix is used in the density pattern method, the printing size is great (256×245 mm) and the pseudooutline cannot be eliminated.

Various other halftone image recording methods are also proposed in addition to this method. However, no such method has been satisfactory.

In other words, when the number of gradation steps is increased, the pseudooutline is formed. On the other hand, when recording is performed by the conventional systematic dither method when the number of input picture elements is limited as in the case of a television picture image, both the halftone image and resolution are degraded. Therefore, a recording apparatus for halftone image recording has been required which solves this problem.

SUMMARY OF THE INVENTION

It is an object of the present invention to provide a novel recording apparatus of halftone image forming type which is capable of eliminating a pseudooutline without requiring an increase in the reading resolution and degrading the recording resolution, so that the apparent halftone area is widened.

It is another object of the present invention to provide a halftone recording apparatus which has a simple construction and which has an increased number of gradation steps in recording.

It is still another object of the present invention to provide a halftone recording apparatus which performs data compression, so that the capacity of the memory may be decreased.

The above and other objects and features of the present invention will become apparent from the following description of the preferred embodiments.

DETAILED DESCRIPTION OF THE PREFERRED EMBODIMENT

The preferred embodiment of the present invention will now be described with reference to the accompanying drawings.

Figure 1:
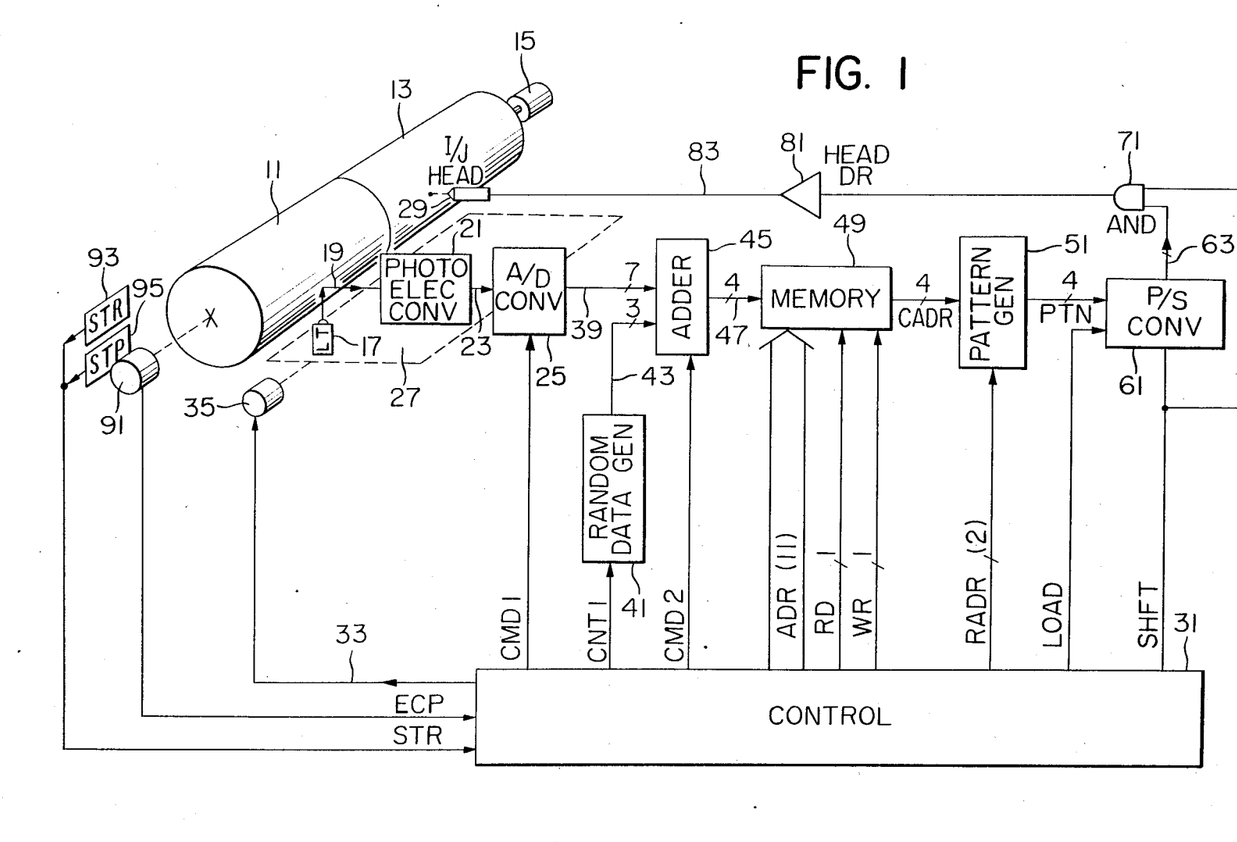
FIG. 1 is a view showing the configuration of a halftone image recording apparatus according to an embodiment of the present invention.

FIG. 1 shows an embodiment of the present invention. An original (not shown) from which the image information is to be read is wrapped around an original drum 11. A recording paper sheet (not shown) is wrapped around a recording drum 13. The rotation of these drums 11 and 13 is synchronized by a pulse motor 15. Main scanning is performed by rotation of these drums. Light is emitted from a reading light source 17 onto the original wrapped around the original drum 11. Light 19 reflected by the original is received by a photoelectric converter 21 which produces a converted electric signal 23. The electric signal 23 is supplied to an analog-to-digital converter (to be referred to as an A/D converter hereinafter) 25. The light source 17, the photoelectric converter 21 and an ink jet (to be referred to as I/J for brevity hereinafter) head 29 are placed on a base 27. In response to a subscanning signal 33 generated by a control 31 for controlling the overall circuitry of the apparatus of this embodiment, a pulse motor 35 is driven to move the base 27 connected thereto in a direction perpendicular to the main scanning direction. Thus, subscanning is performed.

In response to a command signal CMD1 from the control 31, the A/D converter 25 converts the received electric signal 23 into a 7-bit signal 39. With the 7-bit signal 39, it is possible to record an image with 128 (i.e., $2^7$) gradation steps.

Referring to FIG. 1, numbers on respective signal lines represent the number of bits of the signals on these lines.

At the recording side, when a 4×4 dot matrix corresponding to 17 gradation steps is adopted as a basic dot matrix, only the upper four significant bits of the 7-bit signal 39 output from the A/D converter 25 store gradation data and the remaining lower three significant bits do not have any particular meaning.

However, in the embodiment of the present invention, the lower three significant bits of the 7-bit digital signal 39 generated by the A/D converter 25 are added by an adder 45 to a 3-bit level signal 43 generated by a random data generator 41 to provide a 7-bit addition signal. Of seven bits of the 7-bit addition signal, an output signal 47 representing the upper four significant bits is stored in a memory (RAM) 49 as image data. In this manner, the adder 45 performs the operation of adding the 7-bit signal 39 output by the A/D converter 25 to the lower three bits signal 43 (the upper four bits are 0) from the random data generator 41, in effect selecting the most significant four bits of signal 39 for use in image formation. In response to a command signal CMD2 from the control 31, the adder 45 outputs the addition result.

Figure 2A:
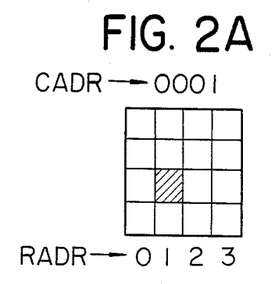
FIGS. 2A to 2C are views showing density patterns.
Figure 2B:
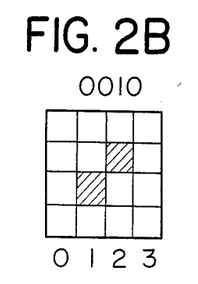
Figure 2C:
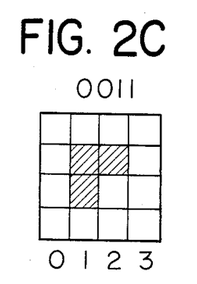

In accordance with an 11-bit address signal ADR which is supplied to the memory 49 from the control 31, the addition results corresponding to one revolution of the drum (2,047 picture elements or less) are stored in the memory 49. These addition results are stored in the memory 49 in response to a WRITE instruction signal WR from the control 31. The data stored in the memory 49 is read out in response to a readout instruction signal RD generated by the control 31, and the data is read out from the line memory 49. Output data (4 bits) from the line memory 49 is a character address signal CADR for performing pattern selection. As shown in FIGS. 2A to 2C, as the binary value of the character address signal CADR increases as (0000), (0001), (0010), (0011), and so on, the image density increases. In accordance with the character address signal CADR supplied from the line memory 49, a pattern PTN stored in a pattern generator 51 is selected. In accordance with a 2-bit row address signal RADR generated by the control 31, one row of the 4×4 dot matrix is selected. For example, if the character address signal CADR is "0011" and the row address signal RADR is "10" row data of a column indicated by a thick line as shown in FIG. 2C is selected. An output signal PTN representing the 4-bit data of the selected row is loaded in a register in a parallel-to-serial (to be referred to as P/S hereinafter) converter 61 in response to a load signal LOAD. The loaded signal is converted into a serial signal in response to a shift signal SHFT. The serial signal thus obtained is supplied to a head driver 81 through an AND gate 71, the gate of which is opened or closed in response to the shift signal SHFT. The ink jet operation of the I/J head 29 is controlled by a drive signal 83 output by the head driver 81.

A pulse encoder 91 is incorporated for the purpose of detecting the rotating positions of the drums. The number of pulses to be generated per revolution of the drum is 8,886 pulses ($\pi \times 100 \times \sqrt{2}/0.050$) if the drum diameter is 100 mm and the dot diameter is 50 $\mu$m. Signal generators 93 and 95 respectively generate a print start signal STR and a print stop signal STP. A necessary interlocking operation for the synchronous rotation of the drums is performed so as not to print at the boundaries of the originals or recording paper sheets.

Figure 3:
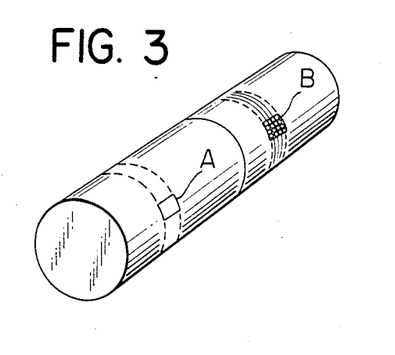
FIG. 3 is a view showing the relationship between an original image and a printed image.
Figure 4:
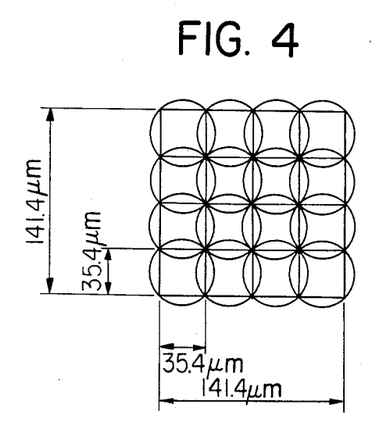
FIG. 4 is a view showing the diameter of the spot of one picture element.

FIG. 3 shows the correspondence between an original image and a printed image. In this case, printing of an image B with the 4×4 dot matrix is assumed to be selected for an original image A. Then, the printed image B has 16 blocks of the 4×4 dot matrix. Therefore, when the original drum 11 is rotated once, the recording drum 13 is rotated four times to form an image of one picture element. The size of the picture element of the 4×4 dot matrix is shown in FIG. 4. The dot diameter is 50 $\mu$m.

As may be seen from the above description, although there are $2^7$ gradation steps during readout of the original image, there are only 17 (4×4+1) gradation steps in recording. If an original of relatively small gradation change such as human skin is recorded in 17 gradation steps, the pseudooutline is generated which degrades the image quality. The pseudooutline is generated since the boundary of the patterns is too bright when only 17 gradation steps are involved. Furthermore, although there are 128 gradation steps in readout, the gradation compression is determined only with the gradation steps at the recording side. This results in low efficiency for the overall system.

Figure 5A:
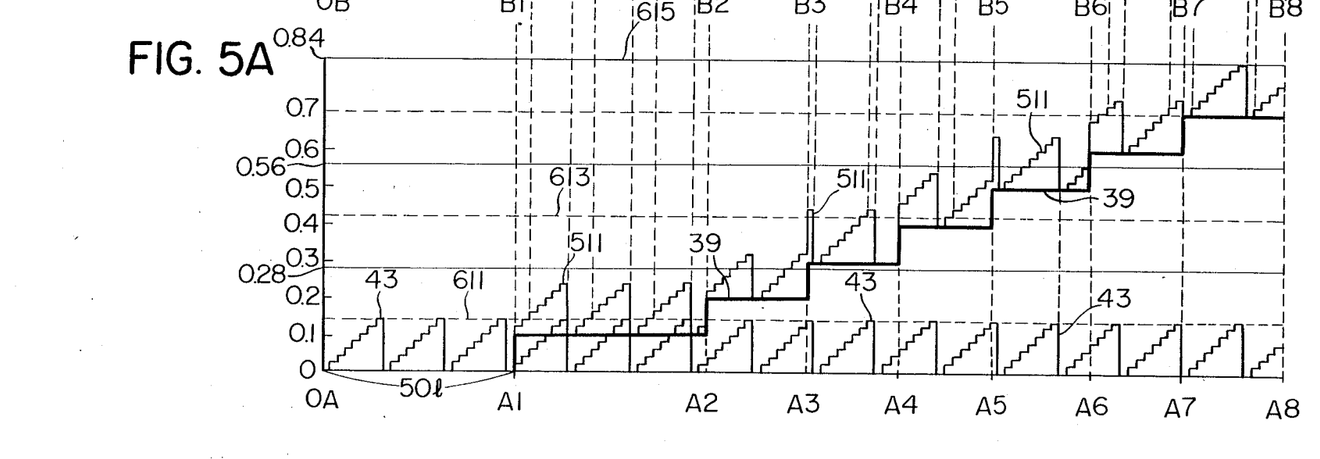
FIGS. 5A and 5B show waveforms of signals at parts of the apparatus shown in FIG. 1.
Figure 5B:
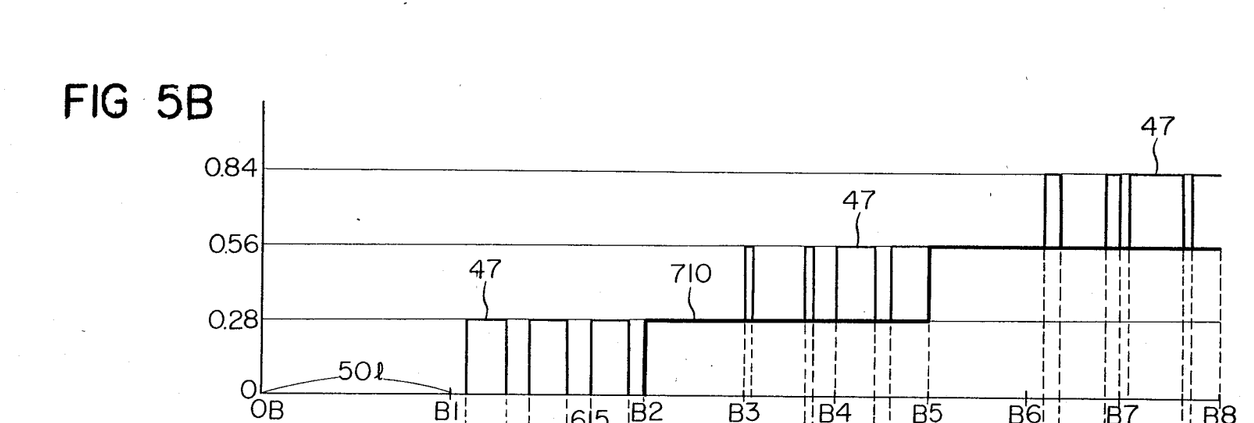

In order to solve this problem, the apparatus of the present invention has the adder 45 and the random data generator 41. FIGS. 5A and 5B show waveforms of signals at parts of the apparatus shown in FIG. 1. In FIG. 5A, the position of the original is plotted horizontally while the readout density of the original image is plotted vertically. At each of points 0A, A1, A2, A3, A4 and so on, the readout density of the original image changes. The 3-bit signal 43 generated by the random data generator 41 is a dither signal which has eight levels from 0 to 7 recurring periodically. The width of one picture element is the same as the pulse width of the dither signal. Thus, 2$l$ is the width of one picture element. An addition signal 511 is obtained from the adder 45 by adding the 3-bit signal or the dither signal 43 to the 7-bit signal 39 representing the readout density of the original image. The upper four significant bits of the addition signal 511 are sliced to provide the signal 47. The slice levels are level 611 (0.14), level 613 (0.42) and level 615 (0.70). However, since 17 gradation steps are involved in practice, there are more slice levels. Only three slice levels are mentioned herein for the sake of simplicity. The signal 47 representing the digital density which is obtained by slicing at the slice levels set in the manner mentioned above is shown in FIG. 5B. In FIG. 5B, the recording position is plotted horizontally while the readout density of the original image is plotted vertically. As in the case of FIG. 5A, at each of points 0B, B1, B2, B3, B4 and so on, the digital density changes, and 2$l$ is the width of one picture element.

A Density signal 710 represents a density signal which is obtained by the conventional method in which the dither signal 43 is not used. The density signal 47 is a density signal which is obtained in accordance with the embodiment of the present invention.

As may be seen from a comparison of these density signals, the density signal 710 obtained by the conventional halftone image forming method has only three steps while the density signal 47 obtained by the embodiment of the present invention has eight steps which will be perceived continuously by the human eye. This will be described in further detail below.

Since no dot is printed between recording positions 0B and B1, the corresponding area on the recording paper sheet is white and a printing density $D_{0B-B1\ at\ this\ area\ is}$ 0. The mean density between recording positions B1 and B2 may be approximated by the arithmetic mean of the densities; the printing density $D_{B1-B2}$ is $(0.28\times(10+10+10))/50=0.17$. A printing density $D_{B2-B3}$ between recording positions B2 and B3 is 0.28. A printing density $D_{B3-B4}$ between recording positions B3 and B4 is $(0.56\times(2+2)+0.28\times20)/24=0.32$. A printing density $D_{B4-B5}$ between recording positions B4 and B5 is $(0.56\times(10+10)+0.28\times4)/24=0.51$. A printing density $D_{B5-B6}$ between recording positions B5 and B6 is 0.56. A printing density $D_{B6-B7}$ between recording positions B6 and B7 is $(0.84\times(4+4)+0.56\times(4+12))/24=0.65$. A printing density $D_{B7-B8}$ between recording positions B7 and B8 is $(0.84\times(14+8)+0.56\times4)/26=0.80$. When a picture element is extremely small (e.g., a square having a side of 0.14 mm length), when patterns of close densities are close to each other and when picture elements of different densities appear at random, the human eye cannot perceive separate patterns. The printing densities take the values as described above so as to allow perception of densities as mean densities. In the embodiment described above, the dither signal 43 is the 3-bit signal in which eight levels periodically recur. However, when random functions are employed and levels 0 to 7 are generated at random, the density patterns mix randomly. As a result, the pattern is hard to perceive and is perceived as a mean density. The dither signal 43 need not be limited to a 3-bit signal.

The pseudooutline is generated at a part where the density changes slowly such as human skin. In this case, the same pattern density continues, and a shift is made to another pattern at the point of the slice level of four bits. Since the density changes two-dimensionally, density pattern change lines resemble contour lines, resulting in a pseudooutline. This is attributable to the fact that the number of density steps is small. Therefore two patterns are distributed over a wide range such that the adjacent patterns may be distinguished from each other clearly.

Although the 3-bit dither signal 43 has eight values in the embodiment described above, it may alternatively be a 1-bit binary signal or a 2-bit quaternary signal. It suffices that the maximum value of the dither signal 43 be suppressed to half the density difference between adjacent patterns. If the input gradation data has m bits and the output gradation data has n bits, the maximum value of the dither signal is $(2^{m-n}/2)$. If the range of the printing density is $D_{max}$ to $D_{min}$, the maximum dither density is $(D_{max}-D_{min})/2^m\times2^{(m-n)}/2$.

Figure 6A:
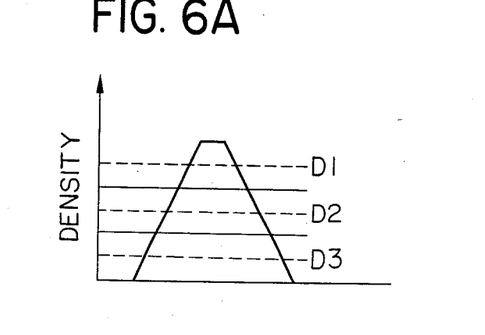
FIGS. 6A to 6C are views for explaining the printing density.
Figure 6B:
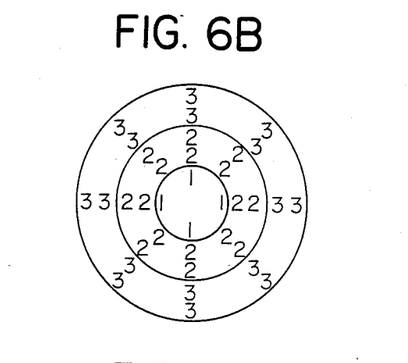
Figure 6C:
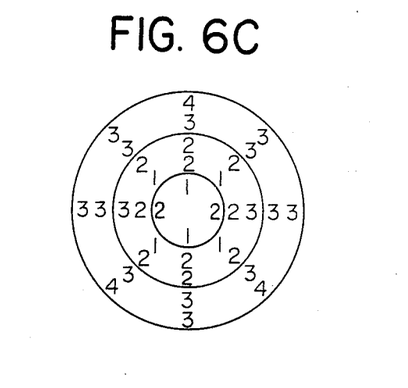

In the embodiment described above, the lower three significant bits are not neglected. A signal generated from the separate 3-bit random data generator is added to the input signal, and the upper four significant bits of the obtained addition signal are utilized. In this manner, close densities are randomly obtained at the part where the density changes slowly. In addition to this, the mean density gradually changes in accordance with the input signal. Then, the boundary between the densities which becomes clear in the conventional method can be eliminated. FIG. 6 shows this in a figurative manner.

FIG. 6A is a side view of a conical body, the density of which changes proportionally with the height. In FIG. 6A, dotted lines D1, D2 and D3 respectively represent slice levels of the density. FIGS. 6B and 6C respectively show model views from the top of the density conical body when it is recorded with dots. In FIGS. 6B and 6C, numbers represent densities. The smaller the number, the higher the density. FIG. 6B corresponds to the conventional method, while FIG. 6C corresponds to the present invention. As may be seen from a comparison of FIGS. 6B and 6C, pseudo-outlines resembling the contour lines are formed and the density changes in a stepped manner, in FIG. 6B. In contrast to this, the boundary is unclear at the density boundary as seen in FIG. 6B, and the mean density gradually changes, in FIG. 6C. Therefore, the stepped change in the density is eliminated, and the density changes continuously.

The effect of the present invention is based on the fact that the gradation is not required for perception of details, recording and reproduction of which require good resolution, but the gradation is required for parts having a wide area.

As may be seen from the above description, the number of gradation steps within the two-dimensional field of human perception is increased and the pseudooutlines are eliminated without changing the number of dots of one picture element, that is, without lowering the resolution. The present invention is quite useful for applications where the number of the picture elements is small but the number of gradation steps of the original image is great, such as a television input signal.

Figure 7:
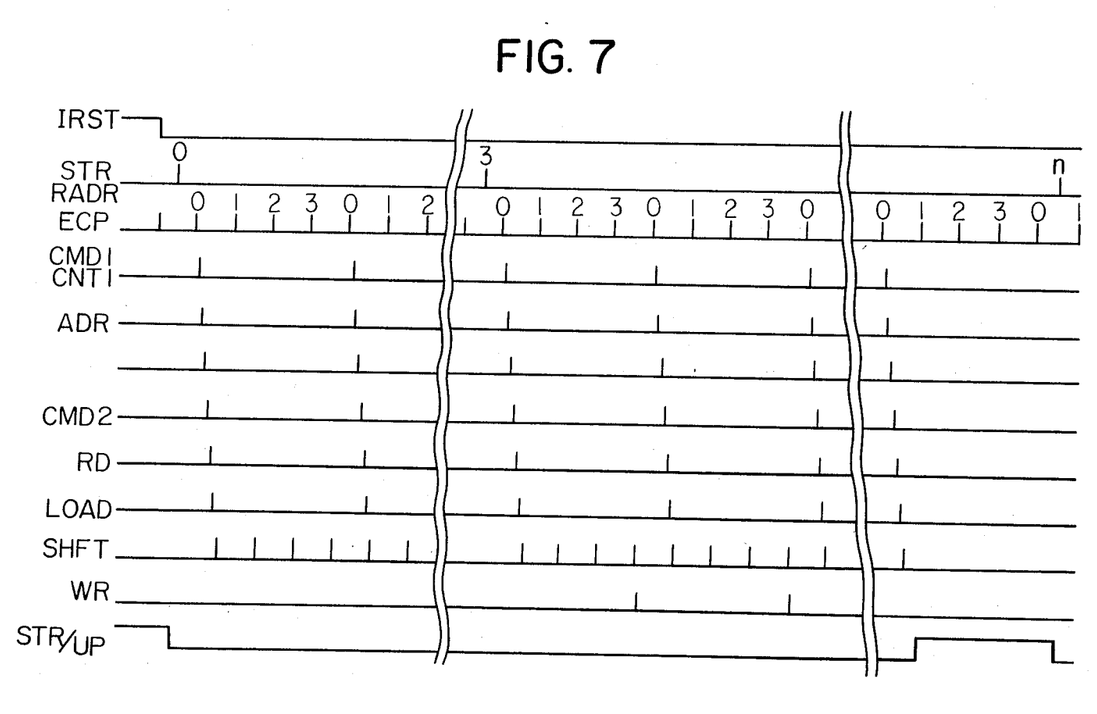
FIGS. 7 and 8 are timing charts and a block diagram, respectively, for explaining the mode of operation of a control circuit.
Figure 8:
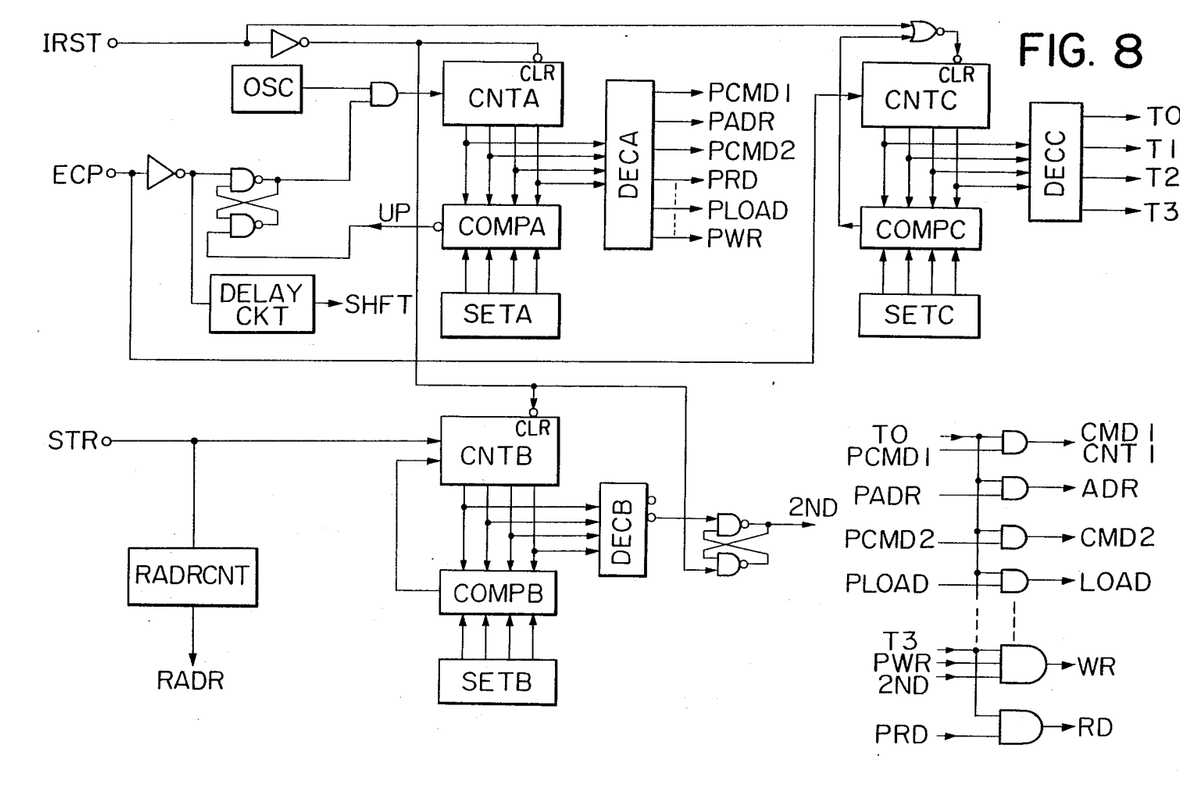

FIG. 7 shows timing charts while FIG. 8 shows a block diagram of the control 31 shown in FIG. 1. The basic dot matrix adopted here is also a 4×4 dot matrix. An encoder pulse ECP is generated by a rotary pulse encoder 91 shown in FIG. 1, while a print start signal STR is generated by the signal generator 93. The print start signal STR is generated once per revolution of the drums 11 and 13. A signal IRST is for clearing the contents in all the memories at the time of power on or initialization of the apparatus of the present invention. A pulse oscillator OSC generates pulses of a frequency 10 to 20 times that of the encoder pulse ECP. Counters CNTA to CNTC and RADRCNT are digital counters, and comparators COMPA to COMPC are digital comparators. The digital comparators COMPA to COMPC generate carry signals UP when the inputs received from the digital counters CNTA to CNTC coincide with the set values of setters SETA to SETC, respectively. Decoders DECA to DECC determine basic pulses of the respective timing pulses. In FIG. 8, a signal 2ND is a signal for discriminating whether the image data corresponding to one revolution of the drum is the data load period or print period. In other words, the signal 2ND is a signal for instructing start of loading of the image data. In the arrangement shown in FIG. 8, the signal 2ND is generated in synchronism with the print start signal STR when the drums 11 and 13 start the fourth revolution after the generation of the signal IRST. Therefore, loading of the image data is started when the drums start the fourth revolution after the initialization of the apparatus.

Referring to FIG. 7, the print start signal STR is generated once per revolution of the drums 11 and 13. The row address signal RADR is generated in synchronism with the print start signal STR. Every time four encoder pulses ECP are generated, command signals CMD1, CNT1, ADR, CMD2, WR, and LOAD are sequentially generated in synchronism with the pulses generated by the pulse oscillator OSC. The shift signal SHFT is a pulse which is output as delayed from a reference pulse, i.e., the encoder pulse ECP. As has been described above, the signal 2ND is generated in synchronism with the print start signal STR. A signal PWR is generated in synchronism with the pulse generated by the pulse oscillator OSC. At time T3 for printing the fourth column-fourth row of the 4×4 dot matrix, the load instruction signal WR for the next image data is generated. Although the carry signal UP shown in FIG. 7 is not shown in FIG. 8, it is generated to interrupt the operation of the control 31.

Although a description has been made with reference to the case of a 4×4 dot matrix, the present invention is not limited to this and the above description basically applies to the case of an n×n dot matrix or an n×m dot matrix.

The present invention is not limited to the configuration as shown in FIG. 8, and may be applied to other signal processing systems as long as the basic signal processing means remains the same. For example, the part at 45 need not be an adder and may be any member which is capable of providing the signal 47 by similar operation.

According to the present invention, if the signal level of the input signal for selection of the pattern has gradation steps exceeding (k·l+1) steps based on the (k·l+1) gradation steps in a conventional k×l dot matrix the lower significant bits of the gradation data are periodically or randomly obtained. These bits are added to the original input signal to provide an input signal for selection of a gradation step by slicing at (k·l+1) levels. In this manner, the drawbacks of the conventional recording apparatuses of halftone image formation type as described above are eliminated.

In summary, a halftone image recording apparatus in which the number of gradation steps is increased at the recording side is realized according to the present invention.

The present invention is not limited to the particular embodiment described above, and various changes and modifications may be made within the spirit and scope of the present invention.

What we claim is:

1. A halftone image recording apparatus comprising:
    signal generating means for generating an m-bit density signal representing a density of an image;
    level signal generating means for generating a level signal;
    converting means for forming a resultant signal using said m-bit density signal and said level signal and for converting the resultant signal into an n-bit density signal, where n is less than m; and
    recording means for recording an image to be reproduced in response to said n-bit density signal, said recording means including image pattern selecting means for selecting an image pattern in correspondence with said n-bit signal.

2. An apparatus according to claim 1, wherein said level signal generating means has periodic level signal generating means for periodically generating the level signals.

3. An apparatus according to claim 1, wherein said level signal generating means has random level signal generating means for randomly generating the level signals.

4. An apparatus according to claim 1, wherein said recording means has dot recording means for dot recording on a recording medium the image pattern selected by said image pattern selecting means to produce a halftone image.

5. An apparatus according to claim 1, wherein said converting means has adding means for adding said density signal and said level signal to generate said resultant signal.

6. An apparatus according to claim 5, wherein said converting means has a memory for storing said n-bit density signal.

7. A halftone image recording apparatus comprising:
    image data generating means for generating m-bit data of an image;
    selecting means for forming resultant data using said m-bit data and for selecting the upper n significant bits of the resultant data to form an n-bit image data, where n is less than m; and
    pattern generating means for generating an image pattern having a plurality of dots, representing a halftone reproduction of the image, in correspondence with said n-bit image data.

8. An apparatus according to claim 7, wherein said selecting means has dither generating means for generating a plurality of dither data pieces for use by said selecting means to form said resultant data.

9. An apparatus according to claim 8, wherein said selecting means has adding means for adding said dither data and said m-bit image data so as to provide image data of upper n significant bits.

10. An apparatus according to claim 9, further comprising a memory for storing the image data of upper n significant bits obtained by said adding means.

11. An apparatus according to claim 9, wherein said dither data generating means has periodic dither data generating means for periodically generating dither data.

12. An apparatus according to claim 8, wherein said dither data generating means has random dither data generating means for randomly generating dither data.

13. An apparatus according to claim 8, 11 or 12, wherein said dither data generating means has a dither data which provides a maximum density value $(D_{max} - D_{min})/2^m \times 2^{(m-n)}/2$ when a density range of the image pattern is $D_{max}$ to $D_{min}$.

14. A halftone image recording apparatus comprising:
    density signal generating means for generating an m-bit density signal representing a density level of an image;
    level signal generating means for generating a level signal;
    operation means for forming an n-bit density signal using said m-bit density signal and said level signal, where n is less than m; and
    dot recording signal generating means for generating a dot recording signal in response to said n-bit density signal.

15. An apparatus according to claim 14, wherein said operation means comprises adding means for adding said m-bit density signal and said level signal to generate said n-bit density signal.

16. An apparatus according to claim 14, wherein said operation means forms a resultant signal using said m-bit density signal and said level signal and selects the upper n significant bits of said resultant signal to form said n-bit density signal.

17. An apparatus according to claim 14, wherein said level signal generating means has periodic level signal generating means for periodically generating level signals.

18. An apparatus according to claim 14, wherein said dot recording signal generating means generates an image pattern composed of plural dots in response to said n-bit density signal.

19. A halftone image recording apparatus comprising:
 density signal generating means for generating an m-bit density signal representing a density level of an image;
 operation means for forming a resulatnt signal using said m-bit density signal and for selecting the upper n significant bits of said resultant signal to form an n-bit density signal, where n is less than m; and
 dot recording signal generating means for generating a dot recording signal in response to said n-bit density signal.

20. An apparatus according to claim 19, further comprising level signal generating means for generating a level signal, and
 wherein said operation means has adding means for adding said m-bit density and said level signal to generate said resultant signal.

21. An apparatus according to claim 19, wherein said dot recording signal generating means generates an image pattern composed of plural dots in response to said n-bit density signal.

* * * * *

UNITED STATES PATENT AND TRADEMARK OFFICE
CERTIFICATE OF CORRECTION

PATENT NO. : 4,578,714

DATED : March 25, 1986

INVENTOR(S) : SUSUMU SUGIURA ET AL.

It is certified that error appears in the above-identified patent and that said Letters Patent is hereby corrected as shown below:

In the abstract, line 11, change "imparing" to --impairing--.

Col. 3, line 49, " "10" " should be --"10",--.

Col. 5, lines 3-4 "at this area is" should be --at this area is--.

Col. 7, line 25, "(k·1+1)" should be --(k·1+1)--.

Col. 7, line 26 "kxl" should be --kxl--.

Col. 7, line 30 "(k.1+1)" should be --(k·1+1)--.

Col. 8, line 14 "m-bit data" should be --m-bit image data--.

Col. 8, line 33 "claim 9" should be --claim 8--.

Signed and Sealed this

Twenty-fifth Day of November, 1986

*Attest:*

DONALD J. QUIGG

*Attesting Officer*     *Commissioner of Patents and Trademarks*